M. JELALIAN.
FENDER FOR AUTOMOBILES.
APPLICATION FILED OCT. 4, 1915.

1,166,593.

Patented Jan. 4, 1916.

Witnesses:
Ralph Calitri
John Colannino

Inventor:
Martin Jelalian

UNITED STATES PATENT OFFICE.

MARTIN JELALIAN, OF CRANSTON, RHODE ISLAND.

FENDER FOR AUTOMOBILES.

1,166,593.  Specification of Letters Patent.  Patented Jan. 4, 1916.

Application filed October 4, 1915. Serial No. 53,923.

*To all whom it may concern:*

Be it known that I, MARTIN JELALIAN, a citizen of the United States, residing at the city of Cranston, in the county of Providence and State of Rhode Island, have invented certain new and useful Improvements in Fenders for Automobiles, of which the following is a specification.

This invention relates to fenders, of that class adapted for the fronts of automobiles, and has for its object to provide a structure having a novel arrangement of spring cushion for absorbing the jar or shock upon the guard rail, when in contact with an obstacle, thereby to prevent damage to the vehicle, and said rail having a pad made of yielding material to assist in preventing injury to a person when struck by the moving vehicle.

The invention contemplates certain novel features of the construction, combination, and arrangement of parts of the improved device whereby important advantages are attained and the construction better adapted and more convenient for use than various other similar devices heretofore employed, all as will be hereinafter fully set forth.

Figure 1:
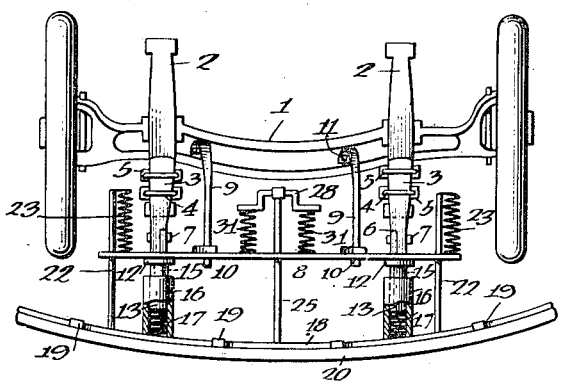
Figure 3:
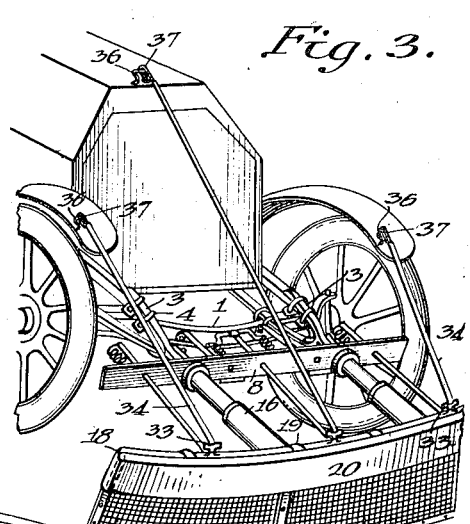
Figure 2:
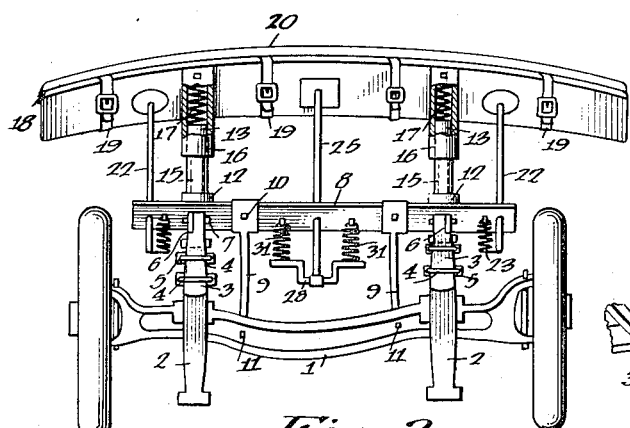
Figure 4:
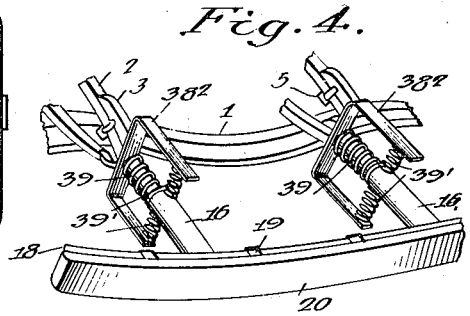
Figure 5:
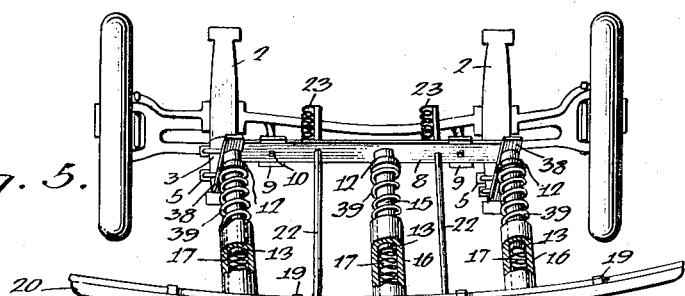

In the accompanying sheet of drawings, wherein like reference characters indicate like parts, Figure 1 is a plan view of my improved fender, as in a compressed position. Fig. 2 is a plan view of the fender, looking toward the rear of its guard rail, and showing the parts of the fender in their normal position. Fig. 3 is a perspective view of the device, as applied to the front of an automobile. Fig. 4 is a perspective view of the fender, showing a modified form of the spring cushion for the guard rail. Fig. 5 illustrates another modification of the spring cushion for the same.

Referring to the drawings, the numeral 1 designates the front axle of an automobile, and 2 the usual sets of flat springs secured to said axle in the usual manner. On each set of springs 2 is a forwardly-projecting support 3, which is secured to said springs by means of common clamp connections 4 and 5. The forward end portions of the supports 3 are reduced to provide a shoulder, as at 6, to receive the flattened end portions of slidable shafts 13, and these reduced portions of said supports are secured to the end portions of said shafts by bolts 7. A flat horizontal bar 8 extends in front of the axle 1 and is perforated to receive the flattened end portions of the shafts 13. Brackets 9 have each one end bolted to the bar 8, as at 10, and the other end bolted to the axle 1, as at 11. The shafts 13 have each an integral collar 12 to rest against the rear face of the bar 8.

The fender 18 has integral tubes 16 designed to have a sliding fit on the shafts 13, and each tube incloses a coil spring 17, whose ends are in expansible contact upon said fender and each of said shafts. A rod connection 25 has one end secured centrally of the fender 18, and said rod passes through a perforation formed through the bar 8 and has its other end secured to an integral crank rod 28. Coil springs 31 have one of their ends attached to the bar 8 and their other ends attached to the crank rod 28. The bar 8 is perforated near each end thereof to receive side rod connections 22, which are secured to the fender 18, and each rod 22 has a coil spring connection 23 from its free end thereof to the bar 8.

When the fender strikes against an obstacle the coil springs 13 are compressed and the coil springs 23, 31 elongated, in the relative position of parts shown in Fig. 1. The tendency of the springs 23, 31 is to counteract the tension of the springs 13 after the latter is compressed through impact against the fender, and to permit the latter springs to force back the fender to its normal position.

By means of the spring arrangement, as described, the shock against the fender is lessened to a great extent and thereby damage to the vehicle is avoided.

In order to lessen injury to a person when struck by the fender I provide the latter with a pad of felt or other such material 20, which is secured in place upon said fender by means of straps 19. The fender 18 has a wire screen $18^1$ which is secured on supports $18^2$ of said fender. The fender is also provided with hooks 33 to receive strap connections 34 having a snap hook 36 with an eye piece 37, secured on the top of the engine-hood and side guards of the vehicle, in the manner shown in Fig. 3.

In Fig. 4 I show a modified form of the spring cushion arrangement for the fender, and wherein the shafts 13 are encircled by compression springs 39 whose ends are interposed between the tubes 16 of the fender and bottom of forked shaped supports 38², which are secured to the axle-springs 2 by the common clamp connections 4 and 5. In this case the elongated springs 39¹ have one of their ends attached to the side of the support 38² and its other end attached to the tube 16.

In the modified construction shown in Fig. 5 additional cushion springs 39 encircle the shafts 15 and their ends interposed between the tubes 16 and collars 12, integral of the supports 38 secured to the axle springs 2. In this case the elongated springs 23 have connection with the bar 8 and the free ends of the rod connections 22, and the latter loosely enter through said bar and are secured to the fender.

Having described my improvements what I claim and desire to secure by Letters Patent is,—

1. In combination with the front main springs and axle of an automobile, forwardly-projecting supports secured to said springs, slidable shafts having flattened portions secured to said supports, a horizontal bar mounted on the flattened portions of said shafts, brackets whose ends are secured to the axle and to said bar, a fender having integral tubes slidably mounted on said shafts, coil springs in expansible contact upon said fender and said shafts, three rod connections carried by the fender and passing loosely through said bar and the central rod connection having an integral crank rod on its free end, and coil springs having one of their ends attached to the said bar and their other ends attached to the free ends of the rod connections and to the crank rod of the central rod connection, substantially as set forth.

2. In combination with the front main springs and axle of an automobile, forwardly-projecting supports secured to said springs, brackets secured to the axle, a horizontal bar forwardly of the axle and carried by said brackets, shafts slidable through said bar and secured to said supports, a fender having integral tubes inclosing said shafts and also carrying rod connections movable through said bar, coil springs in the tubes and in expansible contact with the fender and said shafts, coil spring connections between said bar and the free ends of the rod connections, a removable pad of yielding material secured along the front face of the fender, and strap connections from the latter to the vehicle, substantially as set forth.

3. In combination with the front main springs and axle of an automobile, forwardly-projecting supports secured to said springs, a horizontal bar carried by said supports in front of the axle and said bar having integral shafts, a fender having tubes secured thereto and slidable on the shafts of said bar, expanding coil springs within the tubes, a pad of yielding material secured along the front face of said fender and wire screen carried by the latter and depending therefrom, substantially as set forth.

In testimony whereof I affix my signature in presence of two witnesses.

MARTIN JELALIAN.

Witnesses:
RALPH CALITRI,
JOHN COLANNINO.